(12) United States Patent
Kishimoto et al.

(10) Patent No.: US 7,035,612 B2
(45) Date of Patent: Apr. 25, 2006

(54) ANTENNA DIVERSITY COMMUNICATIONS DEVICE

(75) Inventors: Michinori Kishimoto, Iizuka (JP);
Toshiyuki Wakisaka, Iizuka (JP);
Shoichi Koga, Fukuoka-Ken (JP);
Masami Wada, Fukuoka-Ken (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 628 days.

(21) Appl. No.: 10/050,678

(22) Filed: Jan. 16, 2002

(65) Prior Publication Data

US 2002/0118724 A1    Aug. 29, 2002

(30) Foreign Application Priority Data

Jan. 16, 2001  (JP)  ............................. 2001-007139
Feb. 20, 2001  (JP)  ............................. 2001-043064

(51) Int. Cl.
   *H04B 1/06*    (2006.01)
   *H04B 1/69*    (2006.01)

(52) U.S. Cl. ............................... 455/277.1; 455/277.2; 455/133; 455/41.2; 375/347; 375/132

(58) Field of Classification Search ................ 455/272, 455/277.1, 277.2, 278.1, 133–137, 150.1, 455/41.2, 41.3, 101–103; 375/140, 347, 375/138, 132
See application file for complete search history.

(56) References Cited

U.S. PATENT DOCUMENTS

| 5,329,548 | A  | * | 7/1994  | Borg ........................... 375/135 |
| 5,455,962 | A  | * | 10/1995 | Kotzin ....................... 455/422.1 |
| 5,507,035 | A  | * | 4/1996  | Bantz et al. ................. 455/133 |
| 5,561,673 | A  | * | 10/1996 | Takai et al. ................. 714/708 |
| 5,710,789 | A  | * | 1/1998  | Snodgrass et al. .......... 375/134 |
| 5,758,294 | A  | * | 5/1998  | Ganesan et al. ............ 455/561 |
| 6,006,075 | A  | * | 12/1999 | Smith et al. ................. 455/101 |
| 6,088,337 | A  | * | 7/2000  | Eastmond et al. .......... 370/280 |
| 6,563,858 | B1 | * | 5/2003  | Fakatselis et al. .......... 375/148 |
| 6,594,475 | B1 | * | 7/2003  | Anvekar et al. ......... 455/277.1 |
| 6,603,961 | B1 | * | 8/2003  | Kuroda ....................... 455/133 |
| 6,728,294 | B1 | * | 4/2004  | Kohno et al. ............... 375/133 |
| 2002/0141374 | A1 | * | 10/2002 | Boetzel et al. .............. 370/343 |

FOREIGN PATENT DOCUMENTS

EP          0 622 911 A2     11/1994

(Continued)

*Primary Examiner*—Duc M. Nguyen
(74) *Attorney, Agent, or Firm*—Darby & Darby

(57) ABSTRACT

An antenna diversity communications device switches communications paths between a plurality of antennas to improve reception in a frequency diversity communications system. Antenna selection is done in response to measurement of the receiving condition of the selected antenna. A memory unit stores frequency difference information between the current channel and the next channel. When the frequency difference between the current channel and the next channel is small enough to predict good correlation between the channels, and if current receiving conditions are good, the current channel remains connected. When the frequency difference between the current channel and the next channel is large enough to predict poor correlation, or if the receiving conditions on the current channel are bad, one of the other channels is selected.

26 Claims, 10 Drawing Sheets

FOREIGN PATENT DOCUMENTS

| | | |
|---|---|---|
| EP | 0 780 995 A2 | 6/1997 |
| JP | 5-259950 A1 | 10/1993 |
| JP | 9-284187 A1 | 10/1997 |
| JP | 11-122153 * | 4/1999 |
| JP | 11-122153 A1 | 4/1999 |
| JP | 11-251996 A1 | 9/1999 |
| JP | 2001-7747 A1 | 1/2001 |
| JP | 2001-333003 A1 | 11/2001 |
| WO | WO-97/49199 A2 | 12/1997 |
| WO | WO-01/41329 A1 | 6/2001 |

* cited by examiner

ANTENNA DIVERSITY COMMUNICATIONS DEVICE

BACKGROUND OF THE INVENTION

1. Field of the Invention

The present invention relates to an antenna diversity communications device for communicating using frequency hopping and antenna diversity techniques with a plurality of antennas.

2. Description of the Related Art

In the field of digital wireless communications, spread-spectrum mode has come to be used widely in recent years. One of the techniques for spread-spectrum communications uses frequency hopping technique. Frequency hopping is a communications mode in which the transmitting frequency is not fixed at a specific frequency but switched from one frequency to another in coded sequence.

It is a common phenomenon digital wireless communications creates a multiple-wave transmission path where received reflected waves and diffracted waves overlap direct waves to produce fading due to the synthesis of multiple waves with different arrival times, thus creating transmission errors.

The spread-spectrum communications mode is a countermeasure against fading due to such a multiple-wave transmission path, in which the Direct Sequence (DS) mode and the Frequency Hopping (FH) mode are well-known.

The frequency hopping mode switches (hops) the center frequency of the transmitted signal in a prescribed sequence to spread the spectrum of the transmitted signal over a substantial bandwidth.

If the hopping speed is higher than the information speed, the technique is called a fast frequency hopping mode. If the hopping speed is lower than the information speed, the technique is called a low speed frequency hopping mode.

In fast frequency hopping, a single information symbol is transmitted over a plurality of frequencies. In low speed frequency hopping, a plurality of information symbols are transmitted while the transmitter remains at a single frequency.

The low speed frequency hopping mode can be constituted with simpler devices compared to the fast frequency hopping mode. Thus, the low speed frequency hopping mode is more often employed in systems such as a wireless LAN since a fading countermeasure effect can be obtained using such techniques because resending of missed items and error correction codes are sufficient, although transmission efficiency is sacrificed.

Antenna diversity, on the other hand, is a mode in which signal fading at an antenna is reduced by using a plurality of antennas with low fading correlations. The signals from the antennas are switched to the receiver depending on the levels of signals at the antennas. This method synthesizes a single received signal from the plurality of antennas.

Antenna diversity can be divided into several modes:
a) space diversity using a plurality of antennas spatially separated from each other;
b) polarization diversity using a plurality of antennas of different polarization; and
c) radiation pattern diversity using a plurality of antennas of different directionality.

The present invention relates to antenna diversity.

The combining method in an antenna diversity system can be divided into several methods:

a) the maximum ratio combining method which equalizes each received signal phase and synthesizes received signals by weighting with SN ratios of each received signal;
b) the equal gain combining method which equalizes each received signal phase and synthesizes them as they are; and
c) the selective combining method which selects a signal having the maximum reception level of all received signals.

The combining method can also be divided into a method of combining before detection and a method of combining after detection according to the manner in which the phase of receiver combining is conducted. However, both of these combining methods require such a plurality of receivers that the hardware size is impractically large.

The antenna switching method is simpler. The antenna switching method receives on a single receiver while switching the input between a plurality of antennas. Switching from one antenna to another is performed when the signal level at the receiver drops below a prescribed switching level.

There are two operational algorithms for antenna switching when the signal level from antenna drops below the prescribed signal level:
a) the SE (Switch-and-Examine) mode continues to search outputs of antennas looking for the one providing the highest signal level;
b) the SS (Switch-and-Stay) mode that switches from antenna to antenna until it finds one providing a signal above the switching level. It then remains with that one antenna until the received signal level falls below the switching level. At that time, the next switching operation begins to find another antenna providing a signal exceeding the switching level.

A special problem arises with the antenna switching method used in a mobile station of a digital cellular telephone system using the TDMA (Time Division Multiple Access) mode which is in use in Japan. This problem requires detecting and comparing the reception levels of two antennas within a time slot signal interval immediately before reception of a signal of the local time slot, and then switching to the antenna providing a higher level.

Referring to FIG. 12, a conventional antenna diversity communications device includes two antennas 101 and 102 and the switching unit 103 that selects one or the other of the antennas 101 and 102.

An LNA (Low Noise Amplifier) 104 amplifies the signal from the antenna selected by the switching unit 103 and applies the amplified signal to a mixer 105. A local oscillator signal generated by a local oscillator 106 is applied to the mixer 105. The mixer 105 mixes, or heterodynes, these signals to produce an IF (Intermediate Frequency) signal. The IF signal is applied to an AGC (Automatic Gain Control) 107. The AGC 107 amplifies the inputted signals with a variable gain to maintain a substantially constant amplitude output, and outputs the result to a detector.

A RSSI (Received Signal Strength Indicator) 108 monitors the gain-control signal from the AGC to measure the signal intensities of the signals from the antennas 101 and 102. The output from the RSSI 108 is applied a comparing unit 109, which compares the intensities of the signals from the antennas 101 and 102.

Referring momentarily to FIG. 13, the intensity comparison is conducted during a time slot immediately prior to a local slot. The switching unit 103 switches to the one of antennas 101 and 102 providing a higher intensity signal.

This switching takes place in the time slot immediately prior to the local time slot. By constantly choosing the output of the antenna producing the higher output, the effects of fading are minimized, thereby taking advantage of the antenna diversity effect. By switching the antennas before the local time slot, switching noise remains isolated from the output signal.

The above prior-art device is difficult to use while simultaneously using the frequency hopping mode. In the frequency hopping mode, the signal is a narrow band signal when viewed within a single hopping frequency. Although the signal is affected by fading from the viewpoint of each hopping frequency, the frequency diversity effect can be obtained in the high-speed frequency hopping mode by transmitting a single information symbol on a plurality of frequencies.

On the contrary, the frequency diversity effect is difficult to achieve in the low speed frequency hopping mode because a plurality of information symbols are transmitted on a single frequency. Although the transmission quality can be improved using such techniques as resending missed portions and error correction codes, transmission efficiency drops.

To cope with these problems, the antenna diversity mode is used with the frequency hopping mode at the same time, in particular, the low speed frequency hopping mode, has been conceived. This has proven effective for mobile stations, etc., for using the antenna switching mode that permits the use of simple hardware and processing.

However, the following problems exist in using the antenna diversity mode by the antenna switching method with the frequency hopping mode at the same time.

In the following description, Bluetooth is used as an example of a digital wireless communications system using low speed frequency hopping mode. The present invention can be applied as long as it does not deviate from its purpose using a system other than Bluetooth.

Bluetooth is a wireless communications standard for short distance prepared by its standardization organization, Bluetooth SIG (http://www.bluetooth.com). An outline of the system is reported by Jaap C. Haartsen in the publication, "Bluetooth™: A new radio interface providing ubiquitous connectivity," IEEE Vehicular Technology Conference, Vol., 1, pp 107–111, May 2000," etc.

In Bluetooth, one time slot is 625 μsec. Frequency hopping basically occurs once per time slot. The hopping speed is 1600 hop/sec.

One packet is transmitted during each hop. There is thus no possibility that frequency hopping can occur during transmission of a packet.

Variations in reception level during reception of a packet are negligibly small under busy conditions such as being stationary or walking. Therefore, it is sufficient to switch the antenna once per hop (switching at hopping frequency) when the antenna switching mode is used as an additional mode.

However, since the immediately preceding time slot has a different hopping frequency, the antenna diversity effect cannot be obtained by simply applying the antenna switching mode consisting of detection, comparison and switching of each antenna's reception level to the aforementioned SE and SS modes or in the immediately preceding time slot.

Further, if an antenna is switched by detecting and comparing the reception level of the antenna within the reception time slot, the signal will be affected by switching noise.

OBJECTS AND SUMMARY OF THE INVENTION

It is an object of the present invention to improve communications performance by increasing the affinity between frequency hopping and antenna diversity communications.

More specifically, it is an object of the present invention to provide an antenna diversity communications device having compact hardware using the antenna switching method, while also achieving antenna diversity effects under the frequency hopping mode.

In the antenna diversity communications device according to a first embodiment of the invention, communications are conducted by means of frequency hopping and predetection diversity modes using a plurality of antennas. The antennas are switched based on the frequency correlation between the current channel and the next channel.

The antenna diversity communications device according to the second embodiment of the invention is equipped with a plurality of antennas, a switching unit for alternatively selecting one antenna of said plurality of antennas, a receiving information measuring unit for measuring received information indicating the receiving condition of the antenna selected by said switching unit, a memory unit for storing frequency difference information between the current channel and the next channel, and a switching control unit for controlling the switching unit, which references the frequency difference information and the signal information and orders the switching unit to switch the antenna when hopping to the next channel when a high frequency correlation exists between the current channel and the next channel and the receiving condition is poor.

The construction above guarantees with high probability that the receiving condition of the antenna is close to the receiving condition of the current channel's antenna, even after hopping to the next channel occurs, when frequency correlation is used and a high frequency correlation exists between the current channel and next channel.

Therefore, if frequency correlation is high and the receiving condition of the current channel is poor, it is judged that the particular antenna currently in use provides a poor receiving condition, then hopping to the next channel is accomplished by switching the antenna. If correlation is high and the receiving condition of the current channel is good, it is judged that the receiving condition of the antenna will remain good when hopping to the next channel occurs, and the antenna is not switched.

If the correlation is low, the reception level of the current channel and the reception level of the next channel fluctuate independently, the expectance value that would be obtained when the antenna is switched would be the same as it is when the antenna remains unswitched. Therefore, when frequency correlation is low, it is a matter of indifference whether or not the antenna is switched.

Therefore, a good receiving condition can be maintained even when using the antenna switching method under the frequency hopping mode is performed.

In the antenna diversity communications device according to the third embodiment of the invention, the frequency difference information consists of the frequency of the current channel and the frequency of the next channel, and the signal information is the receiving intensity from the corresponding antenna.

Due to this construction, the switching control unit easily obtains the frequency difference. Also, the signal information indicates the quality of the receiving condition precisely.

The antenna diversity communications device according to the fourth embodiment of the invention is equipped with a threshold value memory unit that stores a first threshold value that determines the level of frequency correlation and a second threshold value that determines the quality of the receiving condition. The switching control unit compares the first threshold value and the frequency difference between the current channel and the next channel and also compares the signal information and the second threshold value.

Due to this construction, the level of correlation and the quality of the receiving condition are easily and quickly judged by simply comparing them with the threshold values.

The antenna diversity communications device according to the fifth embodiment of the invention is equipped with an input unit for accepting the input of environmental information of the surrounding space where communications are conducted. The switching control unit updates the first threshold value based on the inputted environmental information.

Due to this construction, the device can withstand any variation even though the frequency correlation may change depending on the width in the width of the surrounding space.

In the antenna diversity communications device according to the sixth embodiment of the invention, the environmental information distinguishes the environment for a house, an office or the outdoors. This permits the device to accommodate typical surrounding spaces.

In the antenna diversity communications device according to the seventh embodiment of the invention, the first threshold value is on the order of 10 MHz when the environmental information indicates a house, the first threshold value is on the order of 1 MHz when the environmental information indicates an office, and the first threshold value is on the order of 200 kHz when the environmental information indicates the outdoors.

Due to this construction, it can be determined that there is a high frequency correlation when the correlation coefficient is 0.5 or higher. In general, the frequency difference that causes the correlation coefficient to be 0.5 is called correlation band B.

In the antenna diversity communications device according to the eighth embodiment of the invention, the switching control unit does not order the switching unit to switch antennas when hopping to the next channel occurs, when a high frequency correlation exists between the current channel and the next channel and the receiving condition is good. This permits the current antenna to remain in continuous use when the probability of maintaining a good receiving condition is high with continuous use of the current antenna.

The antenna diversity communications device according to the ninth embodiment of the invention is equipped with a plurality of communications paths having antennas, a switching unit for alternatively selecting one path out of plurality of paths, a receiving information measuring unit for measuring received information indicating the receiving condition of the communications path selected by said switching unit, and a memory unit for storing signal information measured by the receiving information measuring unit selecting a communications path based on the signal information stored in the memory unit.

With this construction, the signal information for the current communications path and the current channel for the hopping frequency is measured by the receiving information measuring unit and stored in the memory unit. This makes it possible to reference the signal information of the memory unit when hopping to this channel next time. The reference makes it possible to guaranty with high probability that a good receiving condition is achieved after hopping, hence attenuating fading and improving reception quality. Although this effect is more conspicuous with low speed frequency hopping, it is also possible to combine this embodiment of the invention with fast frequency hopping to achieve a similar performance improvement.

The signal information includes the value indicating received intensity, the value indicating the quality of the receiving condition, the receiving error detection result, etc.

In the antenna diversity communications device according to the eleventh embodiment of the invention, the memory unit stores measured signal information for all hopping frequencies. In this construction, the memory unit stores signal information for all hopping frequencies so that the receiving condition can be more accurately controlled.

In the antenna diversity communications device according to the twelfth embodiment of the invention, the switching unit switches the communications path when the hopping frequency is switched based on the signal information of the next channel stored in the memory unit. With this construction, switching of the communications path occurs outside the reception time slot, so that switching noise generation is reduced.

In the antenna diversity communications device according to the thirteenth embodiment of the invention, the signal information for the corresponding hopping frequency in the storage unit is updated each time the hopping frequency is switched.

This construction makes it possible to update the signal information in order to cope with status changes such as displacement of the communications device.

In the antenna diversity communications device according to the fourteenth embodiment of the invention, the entire body of signal information is collectively updated within the range where a high correlation exists with the corresponding hopping frequency. With this construction, the tracking performance for status changes is further improved by collectively updating the whole signal information within the range where a high correlation exists with the corresponding hopping frequency, and shortening the interval for updating the signal information.

In the antenna diversity communications device according to the fifteenth embodiment of the invention, the range where the whole signal information is collectively updated in the memory unit is made variable. With this construction, it is possible to update the signal information in a wide range in order to improve the sureness of the signal information to a certain degree immediately after the initialization of the memory unit, and then updating the signal information only within a narrow range of high reliability after the updating has approaches a settled condition.

In the antenna diversity communications device according to the sixteenth embodiment of the invention, the memory unit stores the measured signal information, not for the entire hopping frequencies, but for each band formed by dividing the spread-spectrum band. With this construction, it is possible to further improve the tracking performance against status changes by collectively treating each band formed by dividing the spread-spectrum band and shortening the interval for signal information to be updated.

In the antenna diversity communications device according to the seventeenth embodiment of the invention, the switching unit switches the communications path with respect to the band where the next channel belongs, when the hopping frequency is switched based on the signal information stored in the memory unit. With this construction, switching of the communications path occurs outside the reception time slot, so that switching noise generation is reduced.

In the antenna diversity communications device according to the eighteenth embodiment of the invention, the signal information for the corresponding band in the memory unit is updated each time the hopping frequency is switched. With this construction, it is possible to cope with status changes such as displacement of the communications device.

In the antenna diversity communications device according to the nineteenth embodiment of the invention, the memory unit stores only the signal information of one communications path selected by the switching unit. The switching unit switches the communications path to another communications path if the signal information corresponding to this communications path is smaller than the prescribed value. With this construction, it is possible to improve the communications status by switching the communications path. Also, it saves memory capacity of the memory unit.

In the antenna diversity communications device according to the twentieth embodiment of the invention, the memory unit stores all signal information of a plurality of communications paths. The switching unit switches the communications path to the one path that provides the best communications condition. With this construction, the receiving condition can be more closely controlled.

In the antenna diversity communications device according to the twenty-first embodiment of the invention, a plurality of communications paths can be selected with even probability in the initial condition.

In the initial condition, it is unknown which of the communications paths will provide a better communications condition. Therefore, the system can start with a neutral condition where the selection is made with an even probability and then is gradually shifted toward better communications conditions.

In the antenna diversity communications device according to the twenty-second embodiment of the invention, the memory unit returns to the initial condition if no communications occurs for a prescribed time.

If no communications occurs for an extended period of time, the signal information is not updated for an extended period of time, so that the condition is grossly changed when communications are resumed next time. Therefore, the memory unit is returned to a neutral condition and is later shifted toward better communications conditions.

In the antenna diversity communications device according to the twenty-third embodiment of the invention, the signal information is the received intensity of the antenna in the corresponding communications path. With this construction, the communications condition can be more accurately expressed.

In the antenna diversity communications device according to the twenty-fourth embodiment of the invention, transmission is conducted using the antenna in the switched communications path.

If the receiving condition is good, it is expected that the transmission condition, which is the opposite side, is also good. Thus, it is possible to improve the transmission condition using the monitoring result for the receiving condition.

In the antenna diversity communications device according to the twenty-fifth embodiment of the invention, the signal information concerning the transmission channel of the memory unit is updated using the ACK/NCK information in the transmission response. With this construction, it is possible to update the communications information of the transmission time slot and shorten the updating interval in order to further improve the tracking performance against changes in the communications condition.

The above, and other objects, features and advantages of the present embodiment of the invention will become apparent from the following description read in conjunction with the accompanying drawings, in which like reference numerals designate the same elements.

BRIEF DESCRIPTION OF THE DRAWINGS

FIG. 8($b$) is an explanatory diagram for communications information updates concerning the transmission channel for the device of FIG. 6.

DETAILED DESCRIPTION OF THE PREFERRED EMBODIMENTS

Embodiment 1

First, additional explanations about Bluetooth, which is used as an example in this embodiment, are provided below:

The frequency of Bluetooth is 2.4 GHz, the number of hopping channels is 79, and the bandwidth of each channel is 1 MHz. Therefore, the hopping band is 79 MHz. Communications are carried out by hopping within this frequency band.

The received intensity of Bluetooth is specified to be greater than −70 dBm. Reception is impossible if the received intensity is below this value.

Figure 1:
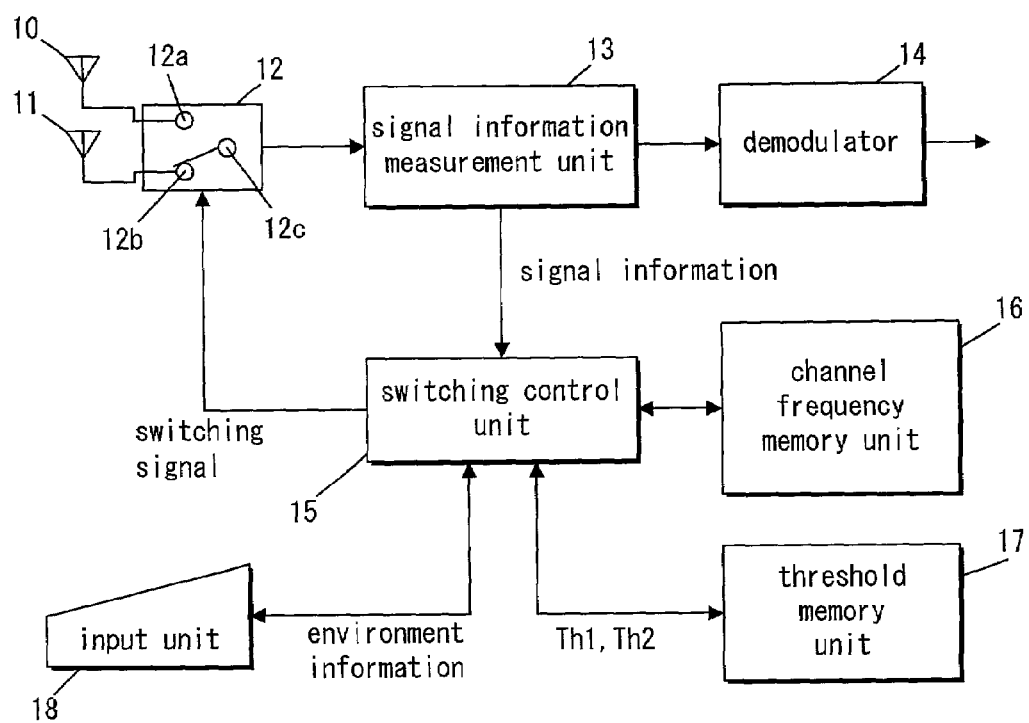
FIG. 1 is a schematic block diagram of the antenna diversity communications device according to a first embodiment of the present invention.

Referring now to FIG. 1, an antenna diversity communications device according to the first embodiment of the present invention includes a plurality of antennas 10 and 11.

Two antennas are used for illustration, although more than two may be used. Transmission is conducted with frequency hopping and pre-detection diversity modes using the antennas 10 and 11.

The antennas 10 and 11 are connected to input terminals 12a and 12b of a switching unit 12. The switching unit 12 has one output terminal 12c which is connected to a signal information measurement unit 13. The switching unit 12 selects one of the antennas 10 and 11 based on the switching signal of the switching control unit 15 and connects selected signal to a signal information measuring unit 13.

The signal information measuring unit 13 measures the received intensity of the signal from the antenna selected by the switching unit 12 and outputs the measured received intensity to a switching control unit 15 as reception information. This reception information can be chosen arbitrarily as long as it can be used for judging the quality of the antenna receiving condition.

The signal information measuring unit 13 also outputs the received signal to the demodulator 14. Since the procedures after the demodulator 14 are arbitrary and are not related to the essential features of the present invention, their descriptions are omitted here.

A channel frequency memory unit 16 stores the frequency of each channel used in communications. Therefore, the switching control unit 15 can locate each frequency of the current channel and the next channel (destination channel in the next hopping) and hence the frequency difference between the current channel and the next channel by referencing the channel frequency memory unit 16.

Since the present embodiment performs communications according to Bluetooth, the channel frequency memory unit 16 requires sufficient memory to store the frequencies of 79 channels.

A threshold memory unit 17 stores the first threshold value Th1 (frequency difference for determining the level of frequency correlation) and the second threshold valued Th2 (received intensity that determines the received quality). Since this embodiment is based on Bluetooth, the second threshold value Th2 is always −70 dBm.

The first threshold value Th1 can assume one of three values, 10 MHz, 1 MHz, and 200 kHz, as described below. These values are arbitrarily chosen values and can be modified if necessary. The threshold memory unit 17 stores these three values and the current first threshold value Th1 and second threshold value Th2.

It is usual that standing waves exist in wireless communications due to interference of multiple waves such as reflective waves, diffractive waves, and refractive waves. The multiple waves are called multipaths. Multipaths produce fluctuation in received intensity called fading. The frequency correlation ρ of fading can be expressed in the following formula:

$$\rho(\Delta f) = 1/(1 + (2\pi \Delta f \sigma)^2)$$ [Formula 1]

In [formula 1], σ denotes the delay spread, and f denotes the frequency. As Δf increases, σ decreases. A small frequency correlation means that each fading is independent. A large frequency correlation means that fadings fluctuate in a similar manner.

When this is applied to the relation between the current channel and the next channel in frequency hopping, it is as follows. If the frequency difference Δf between the current channel and the next channel is small, the receiving conditions of the current channel and the next channel match approximately with high probability. On the other hand, if the frequency difference Δf is large, it is uncertain whether their receiving conditions match.

If this thinking is expanded to include the antenna diversity, it means that, if the frequency difference Δf is small and the receiving condition of the current channel is good, a good receiving condition is likely to occur with a high probability for the next channel when hopping to the next channel (i.e., without switching the antenna).

If the frequency difference Δf is small and the receiving condition of the current channel is poor, poor reception is expected to occur with a high probability for the next channel when hopping to the next channel. Therefore, it is desirable to switch to a different antenna in such a case when hopping to the next channel to use the correlativity of the antennas. The inventors of the present invention obtained the above knowledge and thus were led to completion of the present invention.

Figure 2:
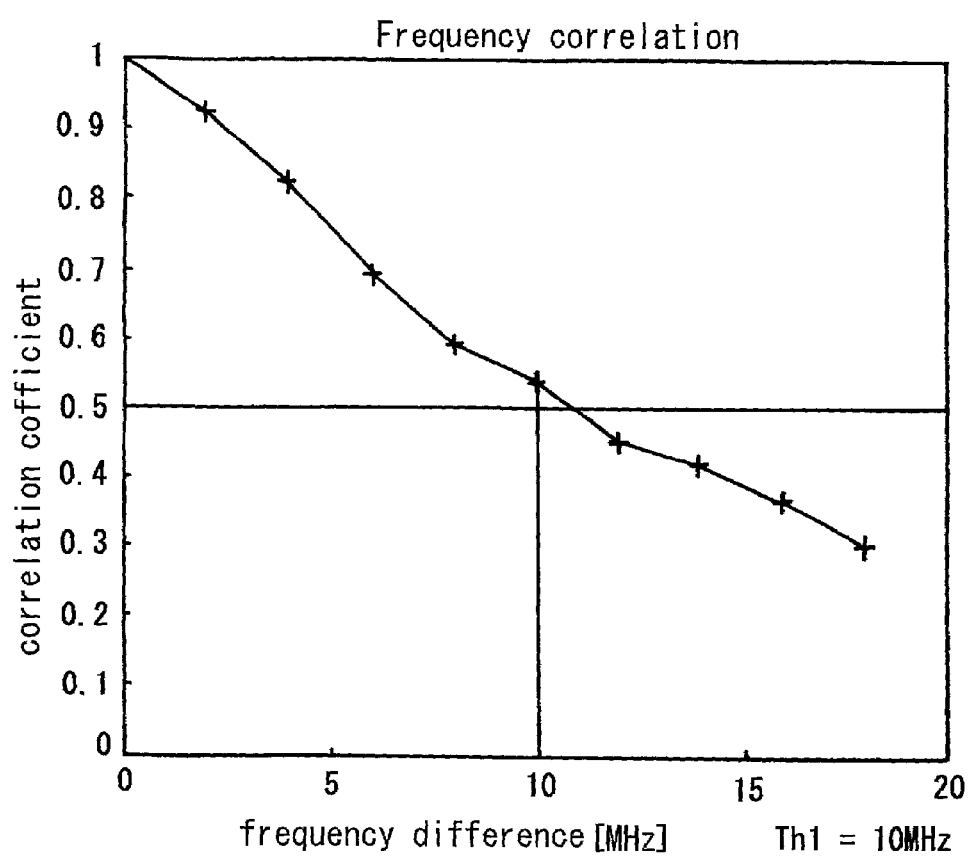
FIG. 2 is a graph showing frequency correlation for a small walled space, such as a house.
Figure 3:
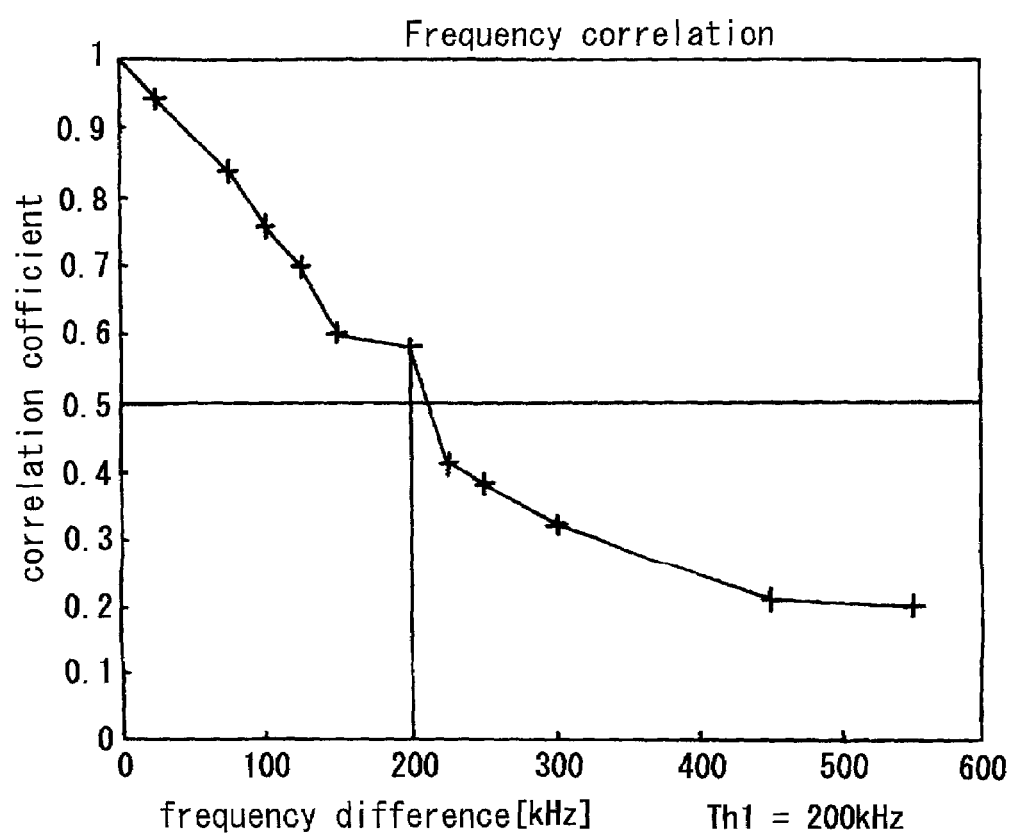
FIG. 3 is a graph showing frequency correlation for a large unwalled space such as, for example outdoors.

Referring now to FIGS. 2 and 3, the relation between the surrounding environment where communications are carried out and the frequency correlation is described. For illustration, a correlation coefficient of 0.5 is used as a threshold value to distinguish between high and low correlation. However, this is an arbitrarily chosen value which can be modified as needed.

In this embodiment, three kinds of surrounding environments are assumed to characterize typical spaces, namely, "house" (to define a narrow space), "office" (to define a medium-sized space; the term "office" is used only as an expression and a warehouse, factory, etc., of a similar size can be included in this category), and "outdoors" (wide-open space with a minimum of obstacles).

These distinctions are intended to classify various surrounding environments where multipaths occur in typical categories. For particular systems, fewer or more categories can be used as needed.

Of these environmental categories, the inventors of the present invention made actual measurements in a small space (house) and obtained characteristics such as shown in FIG. 2. The characteristics indicate, as shown in FIG. 2 as well as can be seen from [Formula 1], that downward frequencies such as the correlation coefficient decreases as the frequency difference Δf (horizontal axis) increases.

The drawing also shows that the correlation coefficient ranges between 0.5 and 1 when the frequency difference Δf is 10 MHz or less. Therefore, we choose 10 MHz as the first threshold value Th1 for houses.

As for offices, "Radio Wave Propagation Handbook" (REALIZE INC., p. 370) provides data concerning the delay spread, σ=100 nsec, in an office. On the other hand, the relation B=1/2πσ applies when the delay profile is an exponential type. B is the delay bandwidth and σ is the delay spread.

With conversions based on the data above, we can determine that the correlation coefficient is 0.5 to 1 when Δf is approximately 1 to 2 MHz or less. Therefore, we choose 1 MHz as the first threshold value Th1 for offices.

As for outdoors, "Frequency correlation characteristics in urban district propagation" (Mitsuishi et al. Nippon Telegraph & Telephone Corp., Yokosuka Electrical Communications Research Lab.), p. 3, FIG. 4 Frequency correlation characteristics in each category provides a set of data, which is summarized in FIG. 3.

Based on the data in FIG. 3, we choose 200 kHz as a first threshold value Th1 for outdoors.

Of course, the three kinds of first threshold values Th1 (10 MHz, 1 MHz and 200 kHz) can be modified arbitrarily within their respective ranges, or according to different environmental surroundings.

Returning now to FIG. 1, the antenna diversity communications device includes an input unit 18 for inputting surrounding environments (house, office and outdoors). The input unit 18, if so desired, can simply consist of push buttons or a rotary switch to permit the user to enter data manually. The input unit 18 can take any other form (keyboard, computer input, etc.) as long as information defining the surrounding environment can be entered.

Figure 4:
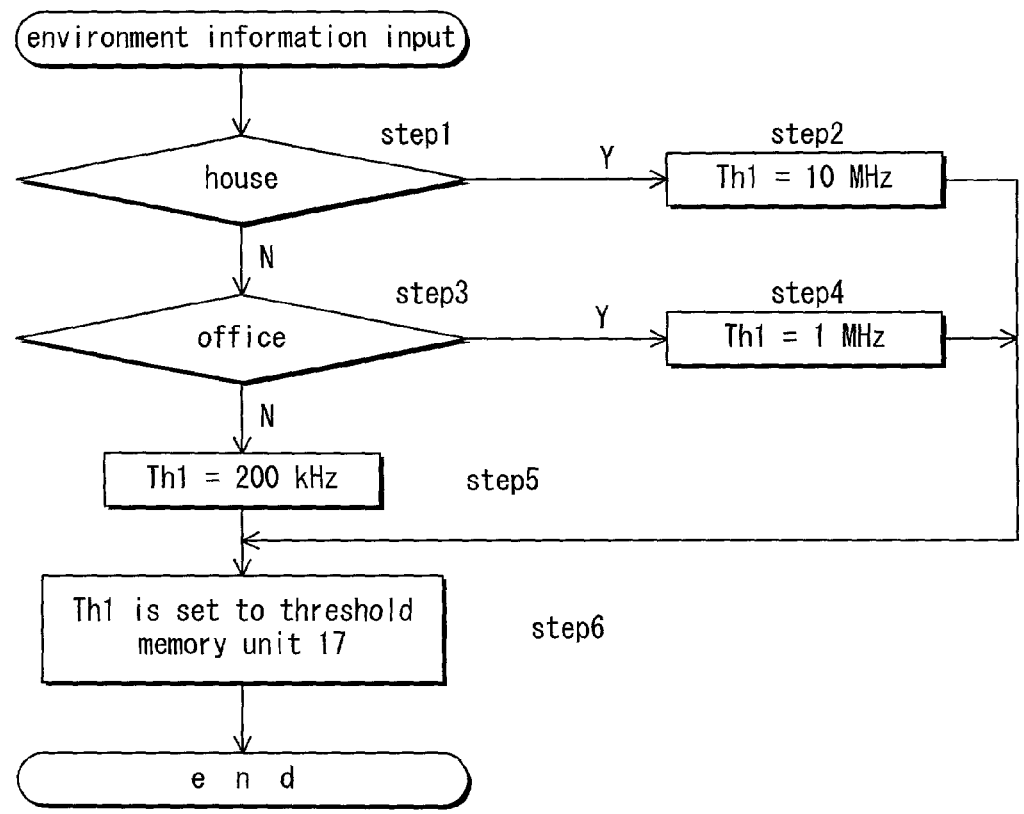
FIG. 4 is a flowchart of the antenna diversity communications device for house.
Figure 5:
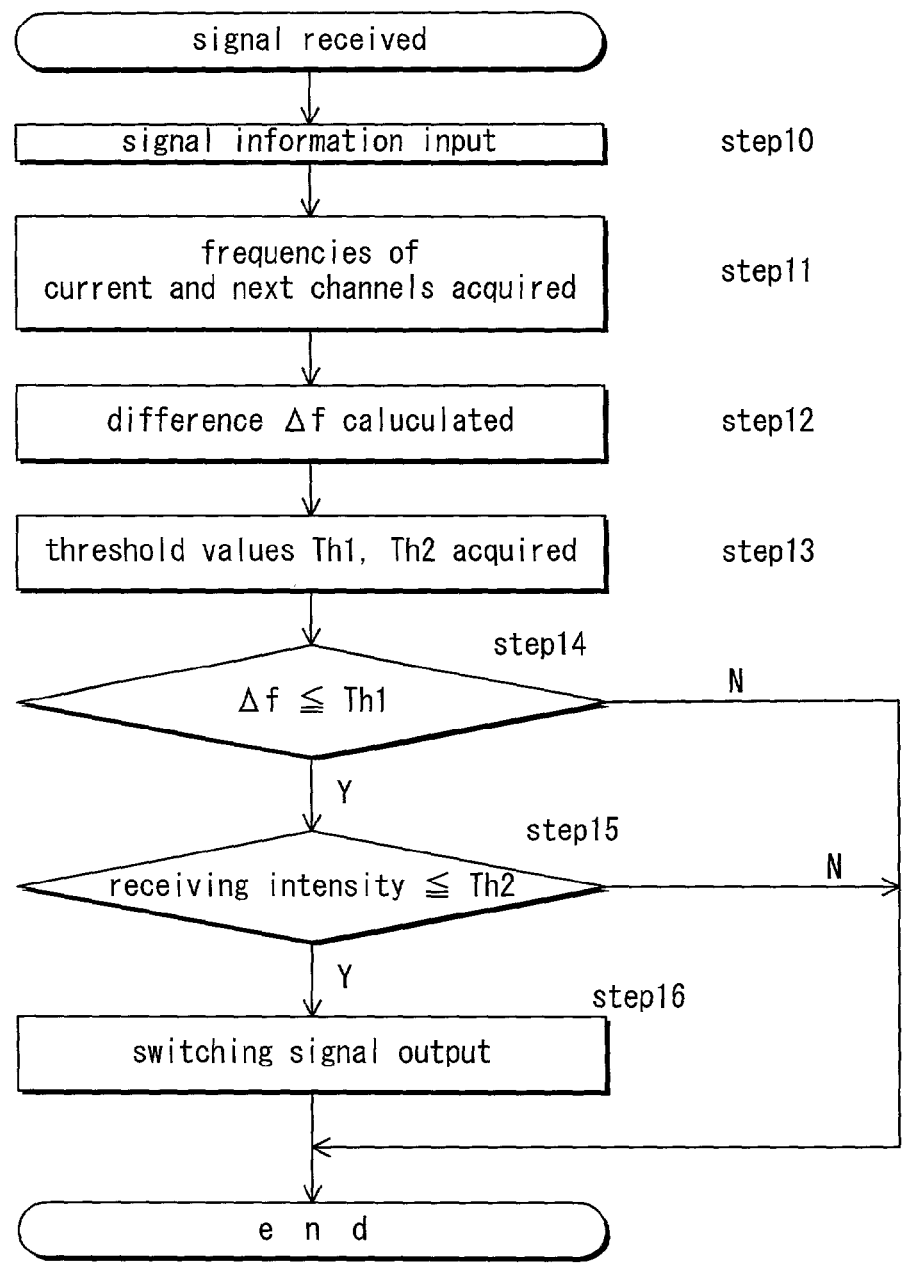
FIG. 5 is a flowchart of the antenna diversity communications device for same.

The switching control unit 15 controls other elements such as the switching unit 12 as shown in FIG. 4 and FIG. 5. The switching unit 15, in particular, references the frequency difference information and the signal information, and orders the switching unit 12 to switch the antenna when hopping to the next channel, if there is a strong frequency correlation between the current channel and the next channel and the receiving condition is poor.

The switching control unit 15 does not order the switching unit to switch the antenna when hopping to the next channel, if there is a high frequency correlation between the current channel and the next channel and the receiving condition is good.

Referring to FIG. 4, the switching control unit 15 inputs the environmental information as shown. First, the switching control unit 15 waits for an input from the input unit 18. If the surrounding environment is a house (step 1), the first threshold value Th1 is set to 10 MHz (step 2), and moves to the step 6.

Similarly, if the surrounding environment is an office (step 3), the first threshold Th1 is set to 1 MHz (step 4), and moves to step 6. If the surrounding environment is outdoors (following step 3), the first threshold Th1 is set to 200 kHz (step 5), and moves to the step 6.

In the step 6, the switching control unit 15 stores the first threshold value Th1 in the threshold memory unit 17.

Referring now to FIG. 5, the switching control unit 15 executes the illustrated process when a signal is received. First, in the step 10, the switching control unit 15 receives signal information from the signal information measuring unit 13 and obtains the received intensity of the current antenna.

Next, the switching control unit 15 accesses the channel frequency memory unit 16 to acquire the frequencies for the current channel and the next channel (step 11), and obtains the difference $\Delta f$ (step 12).

In the step 13, the switching control unit 15 accesses the threshold value memory unit 17 to obtain the first threshold value Th1 and the second threshold value Th2.

Next, the switching control unit 15 compares the frequency difference $\Delta f$ and the first threshold value Th1 instep 14. If $\Delta f$>Th1, the frequency correlation between the current channel and the next channel is low, so the process ends without change. On the other hand, if $\Delta f \leq$ Th1, the process moves to step 15.

In the step 15, the switching control unit 15 compares the received intensity from the current antenna and the second threshold value Th2 at the step 14. If the received intensity is high and the receiving condition is good, it is expected to maintain a good receiving condition with a high probability when the current antenna is used on the next channel, so that the switching control unit 15 ends the process without switching the antenna.

On the other hand, if the current receiving condition is poor, the use of the current antenna is expected to cause the receiving condition in the next channel to be poor with a high probability. Therefore, the switching control unit 15 outputs a switching signal to the switching unit 12 to switch the antenna in step 16.

In this embodiment, it has so far been described that the antenna is not to be switched if $\Delta f$>Th1 in the step 14 as shown in FIG. 5. However, if the frequency correlation of the current channel and next channel is low ($\Delta f$>Th1), the receiving condition in the current channel is almost unrelated to the receiving condition in the next channel, so that the expected value remains the same as it would be if the receiving condition was good regardless of whether or not the antenna is switched. Therefore, the decision process for whether or not the antenna is replaced is as shown in FIG. 5.

The first embodiment of the present invention provides the following effect:

Effect 1

The use of frequency correlation makes it possible to guarantee with a high probability that the receiving condition of the antenna will be maintained in a good condition after hopping. Moreover, since frequency correlation enables use of diversity by the antenna switching method, the size of the hardware can be reduced.

Effect 2

Since the antenna diversity mode can be used without switching the antenna during the reception of a packet in the low speed frequency hopping communications mode, it does not cause switching noise, and thus contributes to an improvement in communications quality.

Embodiment 2

Figure 6:
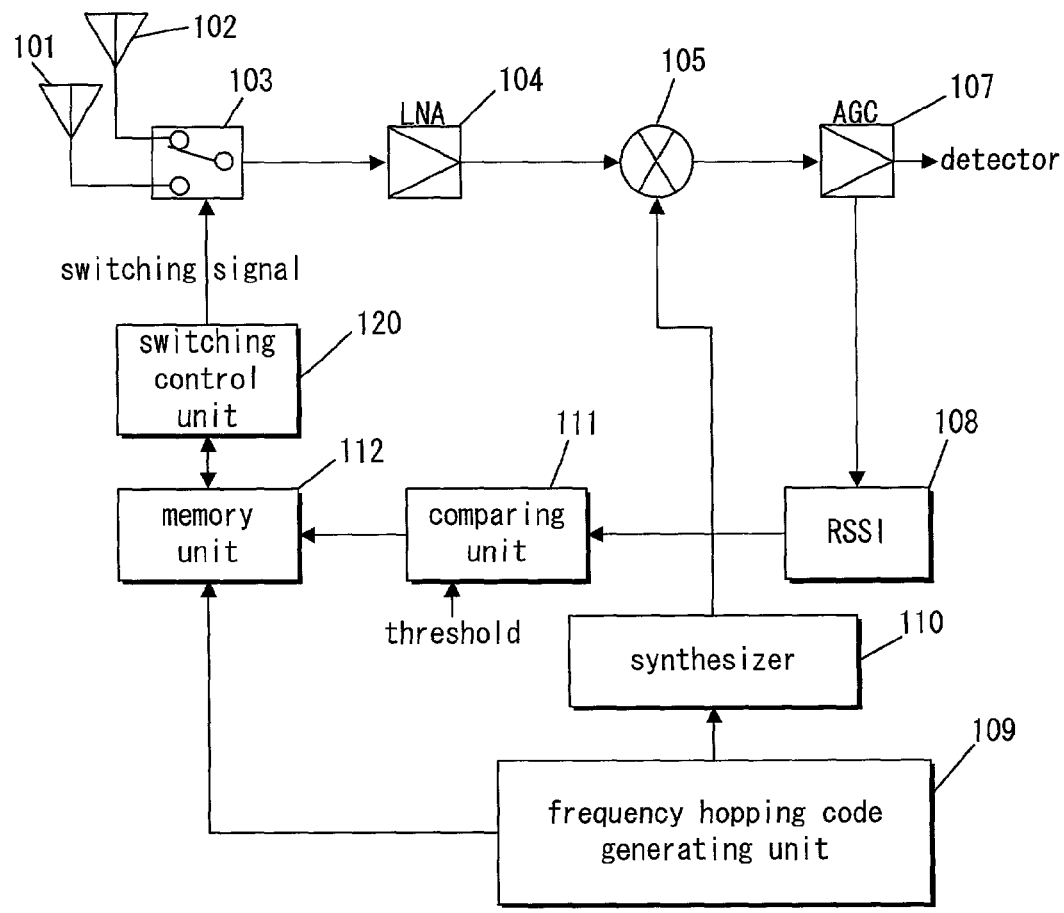
FIG. 6 is a schematic block diagram of the antenna diversity communications device in the second embodiment of the present invention.

Referring to FIG. 6, an antenna diversity communications device, according to a second embodiment of the present invention employs a communications path having two routes, one from the antenna 101 to the switching unit 103, and the other from the antenna 102 to the switching unit 103. One or more additional antennas may also be used. In this embodiment, the two routes provide the capability of implementing the antenna diversity mode and the low speed frequency hopping mode at the same time. The embodiment can also be applied with fast frequency hopping.

A frequency hopping code generating unit 109 generates a hopping code for low speed frequency hopping. A synthesizer 110 generates signals that correspond to the generated hopping code and outputs them to a mixer 105.

Figure 12:
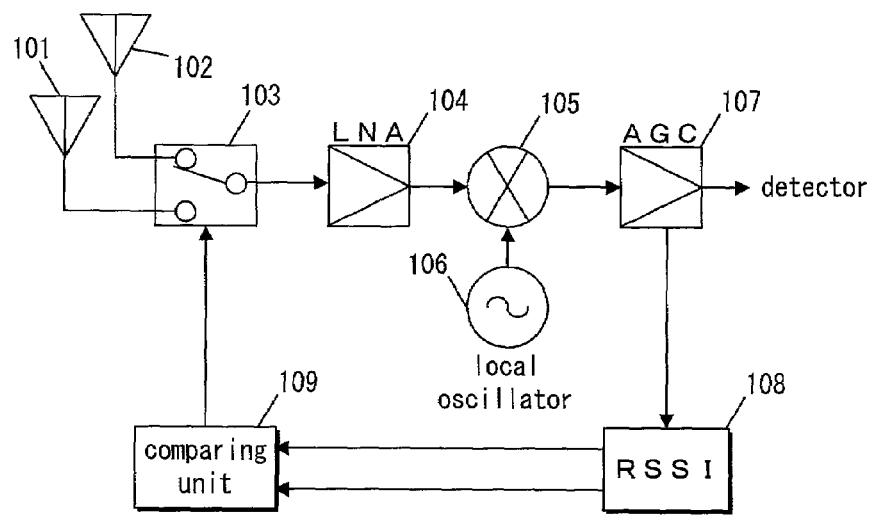
Figure 13:
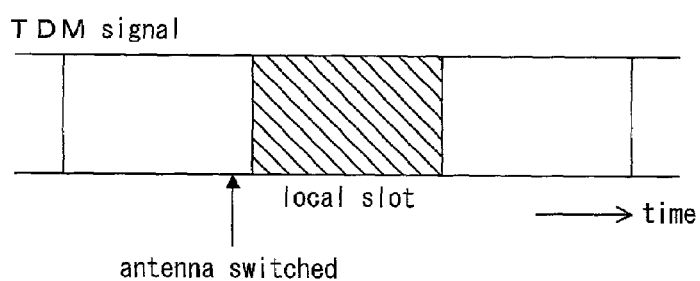
FIG. 13 is an explanatory diagram for the antenna switching timing of the prior art.

A comparing unit 111 receives signals from an RSSI 108 (corresponding to the receiving information measuring unit of FIG. 12) and also receives a threshold value upon which to make a judgment on the quality of the receiving condition. The comparing unit 111 compares the threshold value with the signal information. If the signal information is smaller than the threshold value, the comparing unit 111 determines that the receiving condition is poor. If not, the comparing unit 111 determines that the receiving condition is good.

In this embodiment, the receiving information and the threshold value are both received intensities. Thus, it is possible to judge the quality of the receiving condition with certainty. The threshold should be set to a minimum received intensity.

The receiving information is considered sufficient if it can judged that the quality of the receiving condition is adequate. For example, the comparing unit 111 may perform a simple CRC (cyclic redundancy check), for example to discern that the recieved information is correct.

A memory unit 112 stores reception information for each hopping frequency for each of the two communications routes of the communications path. This makes it possible to manage the receiving condition more precisely.

It is also possible for the memory unit 112 to store the signal information of only one route of the communications path. This makes it possible to handle the task based only on the receiving condition of one communications route, since the correlation between the routes of the communications path is low. Since the probability exists that the communications condition of one communications route may be good while that of another communications route is poor, it is possible to omit the memory of the communications information for a portion of the communications system. This enables the capacity requirement of the memory unit 112 to be saved, and more rational information control to be conducted using correlation.

As for this point, considering a case where there are two routes of communications paths as shown in FIG. 6, there is a possibility that the communications condition is good on one of the communications routes, and that it is poor on the other of the communications routes in the initial condition.

However, it is impossible to know which of the routes is better in the initial condition immediately after turn-on. For example, in initial condition, if one of the routes is used exclusively, we may end up being unable to establish communications itself and thus be forced to disable the diversity control, if the communications condition of the selected route happens to be poor.

In order to avoid such a situation, in the initial condition, the inventors decided not to stick to one of the routes but rather to start with a neutral condition and then to move to a preferable condition in the later stage.

This also applies to a case where communications is reopened after it has been closed for some time. Accordingly in such a case, the memory unit 112 is initialized to make it equivalent to the initial condition in this embodiment.

The signal information of the memory unit 112 is updated by the comparison unit 111 each time hopping occurs. Although it is possible to update only the signal information related to the corresponding hopping frequency, it is preferable to update the signal information over the entire range having higher correlations with the corresponding hopping frequency altogether.

More specifically, since the frequency difference of an adjacent channel is 1 MHz in Bluetooth, the signal information of a range covering three or five channels including the adjacent channels is updated together.

Since these channels have high correlations to each other, they are expected to have a high probability of similar communications conditions. Therefore, by updating them together, it is possible to shorten the intervals of signal information updating and improve the tracking performance against receiving condition changes (for example, in a case where a movement of the communications device is due to the movement of the user).

It is preferable (1) to use a wide range (e.g., 10 channels) as the range for signal updating for a certain initial period of time after the memory unit 112 is updated and use a narrower range (e.g., five channels) after a certain period of time.

The probability of the antenna receiving condition being good is fifty-fifty immediately after initialization of the memory unit 112. Therefore, under such a condition, signal information is updated for a range as wide as reasonably possible in order to improve the reliability of the signal information. On the other hand, after a series of updating processes are carried out during a certain period of time after the initialization, it is more advantageous to update the signal information only within a more reliable narrow range since the information reliability has been already improved to a certain level more than existed immediately after initialization. Consequently, it is preferable to make the range of signal information to be updated variable by, for example, making it wider immediately after the initialization and narrower after a period of time, as shown above.

Moreover, it is preferable (2) to update the communications information related to the transmission channel using ACK/NCK information in response to the transmission.

In the diversity mode during reception, it is also possible to measure and update signal information during the packet reception to be prepared for the next communications using the same channel. However, in the diversity during transmission, the signal information cannot be measured directly at one's own unit.

Therefore, the ACK (acknowledgment)/NCK (no acknowledgment) information in the transmission response is used in such a case. The ACK/NCK information in this case is the same as those used in wireless packet communications.

More specifically, when a transmission packet arrives at the partner's unit without error, the partner's unit responds by attaching ACK information to the packet. In this case, only the communications information during transmission containing the ACK information is considered "good" based on the fact that the ACK information is attached to the packet.

On the other hand, if the partner's unit attaches NCK information to the packet or if there is no response (no response can be received), the communications information is considered "no good."

Thus, it is possible to update the communications information concerning the channel used essentially for transmission and to further improve the tracking performance in response to changes in communications conditions by shortening the communications information updating interval.

Figure 8:
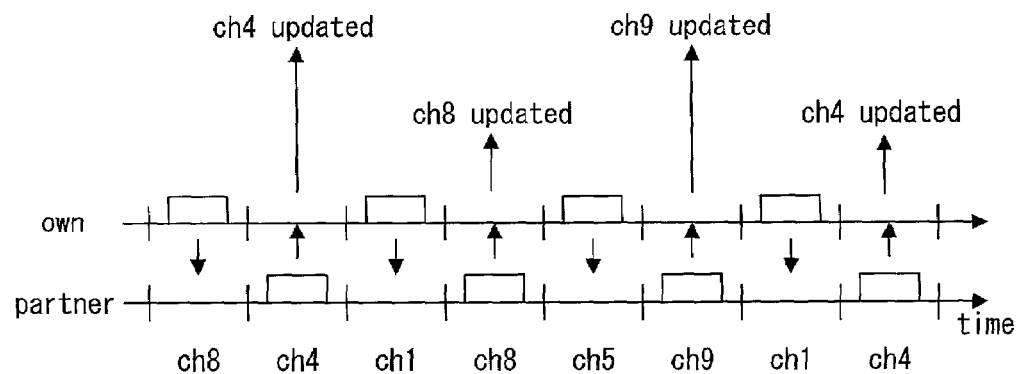
FIG. 8($a$) is an explanatory diagram for communications information updates concerning the reception channel for the device of FIG. 6.
Figure 8:
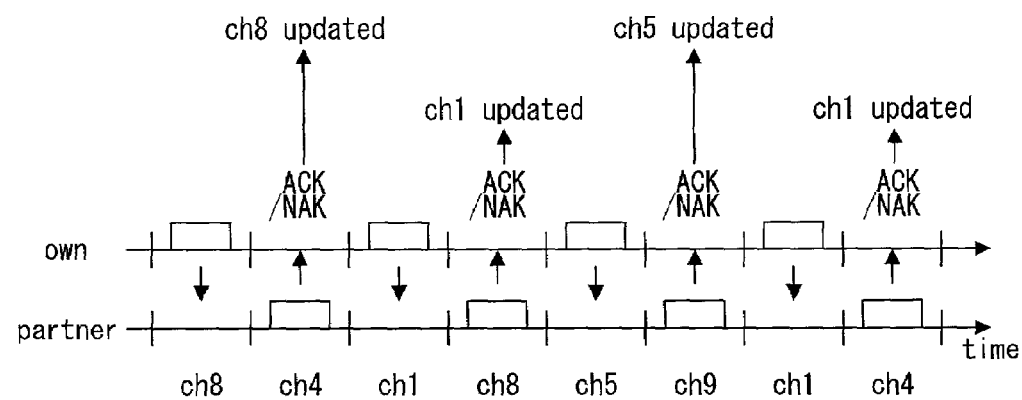

Referring now to FIG. 8(*b*), communications information updating concerning transmission channels is shown. First, the time slot at the left end of FIG. 8(*b*) is a transmission time slot in which the unit sends a transmission packet on ch 8 to the partner's unit. The next time slot is a receiving time slot in which and the receiving unit expects to receive a packet on ch 4 from the partner's unit. This reception packet has ACK/NAK information attached that shows the condition of transmission from the unit to the partner's unit on ch 8.

If ACK information is received in the reception time slot on ch 4, the communications information for the transmission time slot for ch 8 is considered "good." If not, the communications information is "no good."

Thus, the communications information of the transmission time slot on ch 8 can be updated during the reception time slot of ch 4.

Communications information in each of transmission time slots of ch 1, ch 5 and ch 1 is updated during reception time slots ch 8, ch 9 and ch 4 respectively.

Moreover, communications updating concerning the reception channel that is simpler than FIG. 8(*b*) as shown in FIG. 8(*a*). In this case, the information is updated without using ACK/NAK information but instead it is updated by measuring communications information.

In ch 4 communications time slot, the second from the left in FIG. 8(*a*), the communications information of the reception time slot of ch 4 is updated. Similarly, the reception time slots of ch 8, ch 9 and ch 4 are updated during the time slots ch 8, ch 9 and ch 4 respectively.

Of course, it is preferable to update the communications information of a plurality of channels altogether, not the communications information of just one channel.

Returning now to FIG. 6, the switching unit 103 selects the communications path of either antenna 101 or antenna 102 by referencing the signal information of the memory unit 112.

Next, the operation of the antenna diversity communications device of the present embodiment is described in the following. First, the LNA 104 amplifies the received signal of the one of antenna 101 and 102 connected to it by the switching unit 103.

The synthesizer 110 reads a hopping code from a frequency hopping code generating unit 109, and generates a signal having a local-oscillator frequency corresponding to the hopping code. The mixer 105 mixes the signal amplified by the LNA 104 and the output of the synthesizer 110 and converts it to an IF signal.

The AGC 107 amplifies and controls the gain of the IF signal and sends the result to the detector thus executing frequency hopping type receiving demodulation.

The comparing unit 111 compares the threshold value with the received signal intensity measured by the RSSI 108 and outputs the comparison result to the memory unit 112. The memory unit 112 stores the comparison result, the current hopping code, and the current antenna selection signal as a group. This selection signal is the basis for controlling which of the antennas is to be switched during coming time periods.

Figure 7:
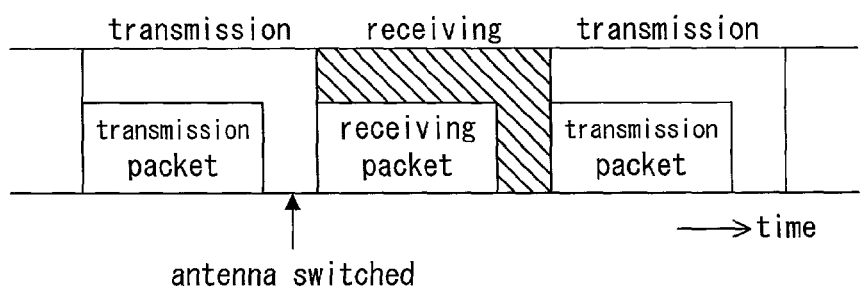
FIG. 7 is an explanatory diagram of the antenna switching timing for the device of FIG. 6.

Next, the antenna switching operation is described taking Bluetooth as an example. Referring to FIG. 7, in the case of Bluetooth, the transmission time slot and the reception time slot are disposed reciprocally as shown in FIG. 7, and frequency hopping is performed for each time slot.

First, the memory unit 112 receives the next hopping code from the frequency hopping code generating unit 9.

The switching control unit 120 references the memory unit 112 to obtain the hopping code of the transmission slot as well as the comparison result and the antenna selection signal, which are stored corresponding to the code.

The switching control unit 120 produces a signal for selecting a different antenna if the obtained selection signal indicates that the comparison result is no good, or a signal to remains connected to the same antenna if the obtained selection signal indicates that the comparison result is good.

The switching control unit 120 outputs this antenna selection signal to the switching unit 103 and stores it in the memory unit 112. This selection signal is maintained during the period of the receiving time slot as shown in FIG. 7.

In the reception time slot shown in FIG. 7, the antenna selected by the switching unit 103 performs receiving demodulation according to the receiving method of the aforementioned frequency hopping mode.

The comparison unit 111 compares the received signal intensity measured by the RSSI 108 with the threshold value, and the comparison result to the memory unit 112. The memory unit 112 stores this comparison result and the current hopping code and the current antenna selection signal as a group.

The operation described above is performed at each transmission slot and reception slot. As a result, the selection signal and the signal information corresponding to the hopping code in each reception slot are updated as occasion demands.

This system provides the antenna diversity effect in the frequency hopping mode in which the hopping frequency is different for each reception slot.

Embodiment 3

Figure 9:
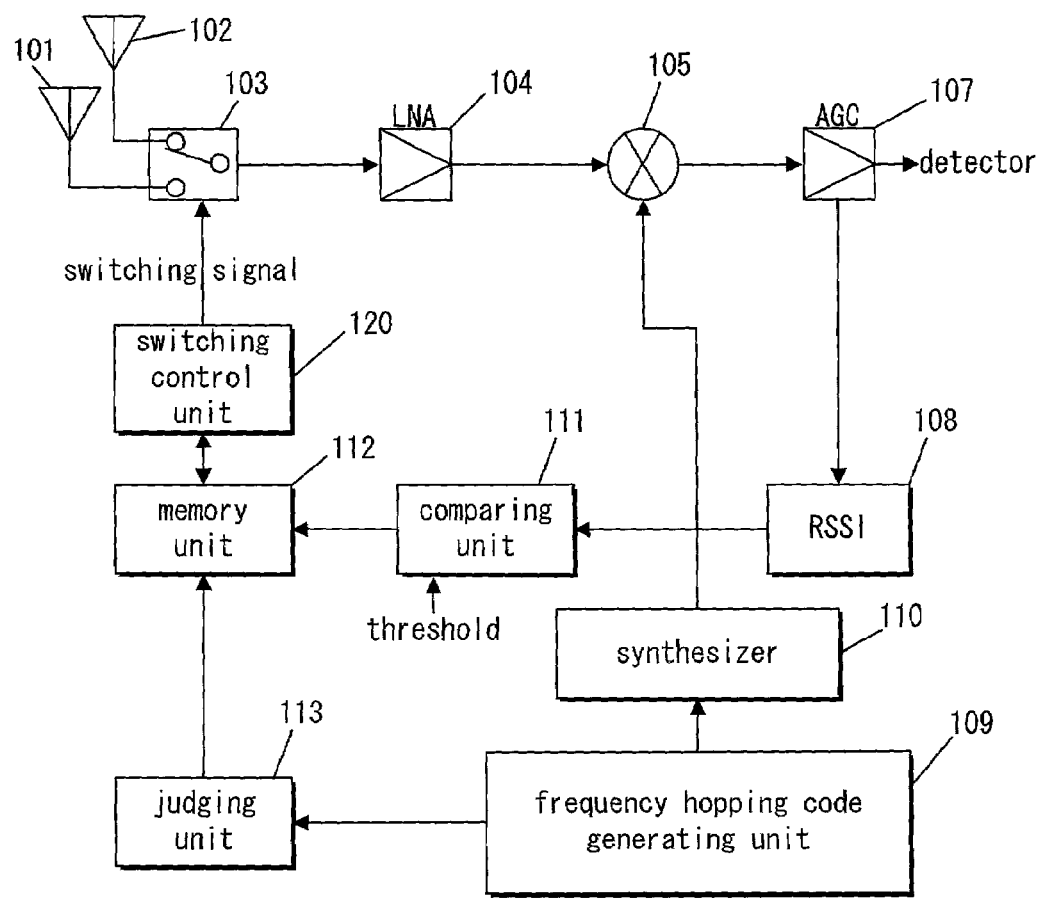
FIG. 9 is a schematic block diagram of the antenna diversity communications device in the third embodiment of the present invention.

Referring now to FIG. 9, an antenna diversity communications device in the third embodiment of the invention employs a communications path having two routes. One route passes from the antenna 101 through the switching unit 103. The other route passes from the antenna 102 through the switching unit 103. One or more additional routes also may exist without departing from the spirit and scope of the invention. The two routes provide the capability of implementing the antenna diversity mode and the low speed frequency hopping mode at the same time. The device of FIG. 9 can also be applied to a case where fast frequency hopping is used.

The antenna diversity communications device stores the signal intensity of the received signal for each band formed by dividing the spread-spectrum band, and switches the communications path based on the signal intensity of each divided band where the previously stored hopping frequency belongs. The antenna diversity communications device switches the communications path when the hopping frequency is switched, measures the signal intensity during signal reception, and updates the information of the divided band where the hopping frequency of the memory unit belongs.

The present embodiments differs from the second embodiment in that a judging unit 113 is connected between the frequency hopping code generating unit 109 and the memory unit 112.

The judging unit 113 reads the hopping code from the frequency hopping code generating unit 109 and judges to which of the plurality of bands formed by dividing the spread-spectrum band the hopping code belongs. The judgment result by the judgment unit 113 is applied to the memory unit 112 together with the data for switching of the signal intensity of the band to which the hopping code belongs and the communications path based on the selection signal.

The comparing unit 111 compares the threshold value with the received signal intensity measured by the RSSI 108 during the reception slot and outputs the comparison result to the memory unit 112. The memory unit 112 stores the comparison result, the current hopping code, and the current antenna selection signal as a group.

In dividing the spread-spectrum band into a plurality of sections in the present embodiment, the fading frequency relation shown in [Formula 1] is used as described in the first embodiment.

In this case, the fading fluctuations of two received signals with different frequencies are more or less in unison if the frequency correlation is large, while the fading fluctuations of such received signals are more independent of each other if the frequency correlation is small. Consequently, the signal intensity of each antenna within a frequency difference of a relatively high frequency correlation tends to be close to each other with a high probability. Thus, if the band is divided with respect to each frequency difference of a relatively high frequency correlation, only one signal intensity of a hopping frequency within a divided band needs to be stored, so that memory capacity size can be minimized.

According to the result of measuring frequency correlations of fading in houses by the inventors of the present invention, the average frequency difference that causes the frequency correlation value to drop down to 0.5 is found to be approximately 10 MHz.

The spread-spectrum bandwidth of Bluetooth is approximately 80 MHz, with the interval between each hopping frequency of 1 MHz. Therefore, for Bluetooth, it is preferable to divide the spread-spectrum bandwidth into eight bands with an increment of 10 MHz. Dividing a band this way reduces the number of signal intensities and selection signals to be stored. The present embodiment is equal to the second embodiment other than in this point.

Embodiment 4

Figure 10:
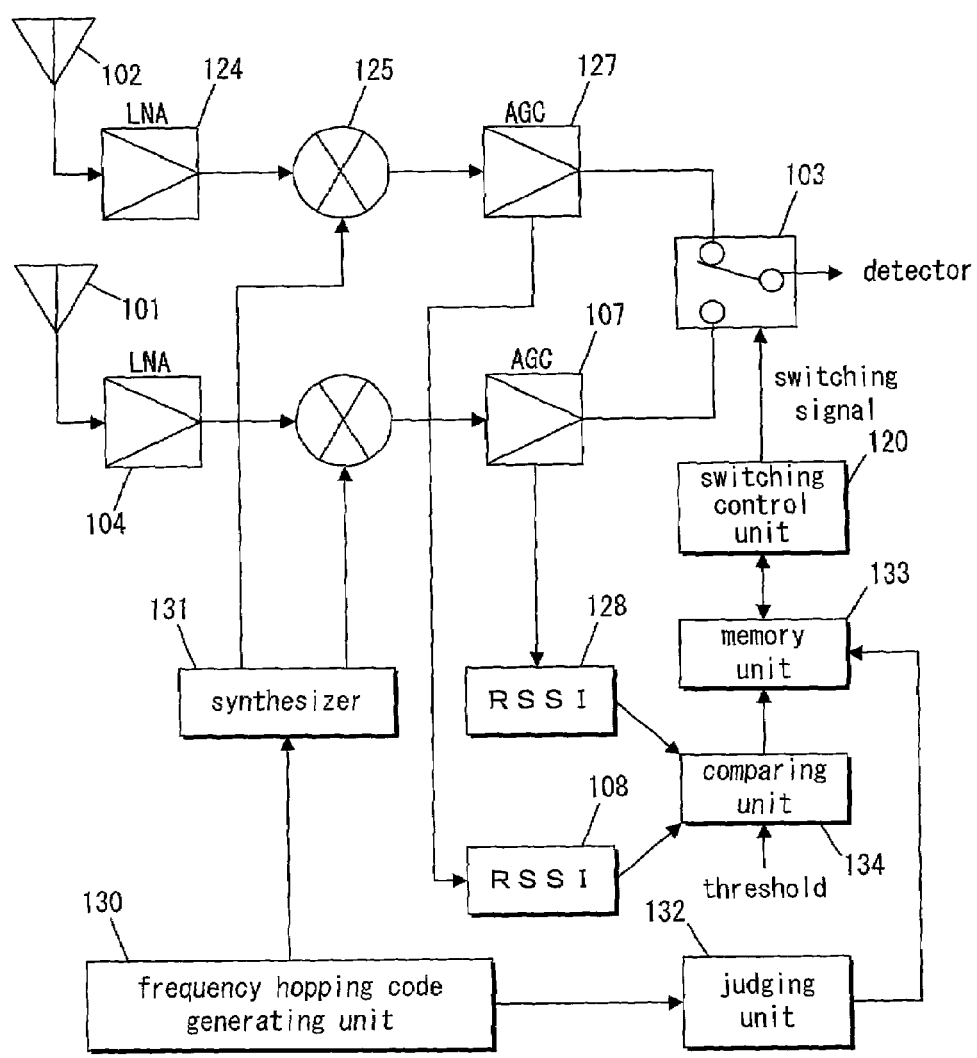
FIG. 10 is a schematic block diagram of the antenna diversity communications device in the fourth embodiment of the present invention.
Figure 11:
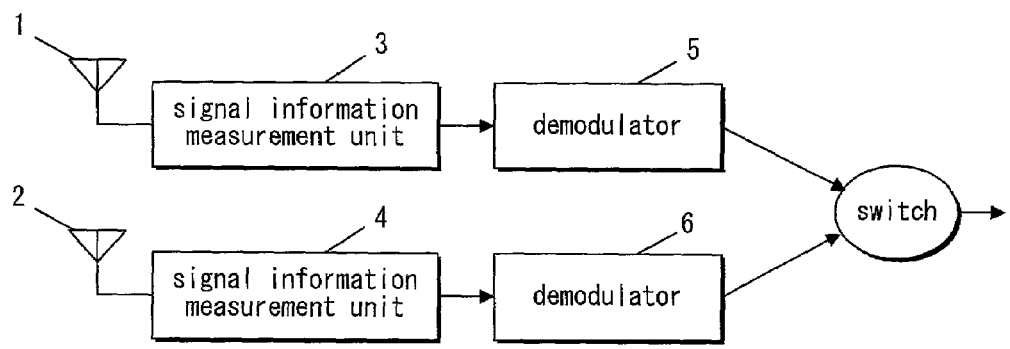
FIG. 11 and FIG. 12 are schematic block diagrams of the antenna diversity communications devices of the prior art.

Referring now to FIG. 10, an antenna diversity communications device of the fourth embodiment of the present invention includes a communications path having two routes. One route contains the antenna 101, the LNA 104, the mixer 105, the AGC 107 and the switching unit 103. The other route contains the antenna 102, the LNA 124, the mixer 125, the AGC 127 and the switching unit 103. One or more additional routes may also be used. In this embodiment, the two routes provide the capability of implementing the antenna diversity mode and the slow frequency hopping mode at the same time. The embodiment can also be applied to a case where fast frequency hopping is used.

The antenna diversity communications device of this embodiment stores the signal intensity of the received signal for each band formed by dividing the spread-spectrum band, and conducts the communications path switching based on the signal intensity of each divided band to which the previously stored hopping frequency belongs. The antenna diversity communications device switches the communications path when the hopping frequency is switched, measures the signal intensity during signal reception, and updates the information of the divided band in which the hopping frequency of the memory unit belongs.

Each of the two routes has its own RSSI 108 and 128, which makes this embodiment different from the third embodiment. A memory unit 133 receives from a judgement unit 132 the judgment result identifying the band to which a hopping frequency of the memory unit belongs. The signal intensities of the two communications routes of the band are outputted from the two RSSIs 128 and 108 to a comparing unit 134.

The comparing unit 134 compares the received signal intensities measured by the RSSIs 108 and 128 with the threshold value, and outputs the comparison result to the memory unit 133. The memory unit 133 stores this comparison result, the current hopping code, and the current antenna selection signal as a group. The memory unit 133 stores two signal intensities and the identified band as a group during the reception slot.

The method for dividing the spread-spectrum band into a plurality of sections is the same as in the third embodiment.

By measuring and storing the signal intensity of the two communications routes, it is possible to switch to a communications route with stronger signal intensity.

For example, even if two communications routes both exceed the threshold value, it is possible to switch to the communications route that has the stronger communications intensity to further improve the quality of reception. The present embodiment is the same as the second embodiment other than in this point.

The second through fourth embodiments provide the following effects:

Effect 1

Antenna diversity effect can be achieved in the frequency hopping mode by applying the antenna diversity technique of the antenna switching method and the pre-detection selective combining method. Consequently, fading caused by each frequency hopping can be reduced, thus improving the receiving quality.

Effect 2

Switching noise can be eliminated because switching occurs outside the reception time slot.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An antenna diversity communications device for communicating by frequency hopping among a plurality of channels, comprising:
   at least two antennas;
   a unit operable to determine a pre-detection diversity of signals from said at least two antennas; and
   a unit operable to switch signals from said at least two antennas based on frequency correlation between a current channel and a next channel.

2. An antenna diversity communications device according to claim 1 wherein said frequency correlation is related to a magnitude of a frequency difference between said current channel and said next channel.

3. An antenna diversity communications device comprising:
   at least first and second antennas;
   a switching unit operable to alternatively select a received signal from one of said at least first and second antennas;
   a reception information measuring unit operable to measure received information that indicates a receiving condition of one of said at least first and second antenna currently selected by said switching unit;
   a memory unit operable to store frequency difference information between a current channel and a next channel;
   a switching control unit operable to control said switching unit; said switching control unit being responsive to said frequency difference information and said signal information to order said switching unit to connect to a different one of said at least first and second antennas when hopping to a next channel if a high frequency correlation exists between said current channel and said next channel and a current receiving condition is poor.

4. An antenna diversity communications device according to claim 3, wherein:
   said frequency difference information is a frequency range between a frequency of said current channel and a frequency of said next channel; and
   said signal information is received intensity of a corresponding antenna.

5. An antenna diversity communications device according to claim 4, further comprising:
   a threshold memory unit operable to store a first threshold value for determining a level of frequency correlation and a second threshold value for determining a quality of the receiving condition;
   a unit operable to compare a frequency difference between said current channel and said next channel with said first threshold value; and
   a unit operable to compare said signal information with the second threshold value.

6. An antenna diversity communications device according to claim 5, further comprising:

an input unit operable to receive environment information of a surrounding space where communications are conducted; and said switching control unit includes a unit operable to update said first threshold value based on received environment information.

7. An antenna diversity communications device according to claim 6, further comprising:
said received environment information includes an item for discriminating between at least two types of spaces.

8. An antenna diversity communications device according to claim 7, wherein said at least two spaces include at least spaces typified by at least two of houses, offices and outdoors.

9. An antenna diversity communications device according to claim 8, wherein:
said first threshold is about 10 MHz when said environment information indicates a house environment;
said first threshold is about 1 MHz when said environment information indicates an office environment; and
said first threshold is in the order of 200 kHz when said environment information indicates an outdoor environment.

10. An antenna diversity communications device according to claim 7, wherein said first threshold is a threshold giving predetermined values of correlation in said at least first and second spaces.

11. An antenna diversity communications device according to claim 3, wherein:
said switching control unit is operable to omit ordering said switching unit to switch to another antenna when hopping to a next channel if a high frequency correlation exists between said current channel and said next channel and the current receiving condition is good.

12. An antenna diversity communications device for communicating by means of frequency hopping, said communications device comprising:
at least first and second communications paths;
a first antenna on said first communications path;
a second antenna on said second communications path;
a switching unit operable to alternatively select one said first and second communications paths from said at least first and second communications paths;
a reception information measuring unit operable to measure signal information that indicates a receiving condition of a path selected by said switching unit;
a memory unit operable to store signal information measured by said reception information measuring unit; and
a unit operable to select one of said at least first and second communications paths based on said signal information stored in said memory unit;
wherein said signal information of a hopping frequency of a current channel is updated each time said hopping frequency is switched, said signal information of said hopping frequency of said current channel being stored in said memory unit, and said signal information stored in said memory unit is updated altogether in a range where high correlations between said corresponding hopping frequencies exist.

13. An antenna diversity communications device according to claim 12, wherein said signal information stored in said memory unit includes at least one combination of a value showing received intensity, a value showing quality of receiving conditions, and a receiving error detection result.

14. An antenna diversity communications device according to claim 12, wherein said memory unit includes a unit operable to store measured information for all hopping frequencies.

15. An antenna diversity communications device according to claim 14, wherein said switching unit includes a unit operable to switch between said at least first and second communications paths when said hopping frequency is switched based on said signal information of said next channel stored in said memory unit.

16. An antenna diversity communications device according to claim 12, including a unit operable to permit adjustment of a range where said signal information of said memory unit is updated altogether.

17. An antenna diversity communications device according to claim 12, wherein said memory unit includes a unit operable to store said measured signal information not for all hopping frequencies but for each divided band formed by dividing the spectrum spread band.

18. An antenna diversity communications device according to claim 17, wherein said switching unit includes a unit operable to switch between said at least first and second communications paths when switching said hopping frequency based on said signal information to be stored in said memory unit concerning said band where said next channel belongs.

19. An antenna diversity communications device according to claim 17, wherein said signal information of said corresponding band of said memory unit is updated each time when said hopping frequency is switched.

20. An antenna diversity communications device according to claim 17, wherein:
said memory unit is operable to store only signal information of the single communications path selected by said switching unit; and
said switching unit includes a unit operable to switch said communications path to another communications path if said signal information of said communications path is smaller than said prescribed value.

21. An antenna diversity communications device according to claim 12, wherein:
said memory unit is operable to store all of said signal information for said at least first and second communications paths; and
said switching unit further includes a unit operable to switch one of said at least first and second communications paths that provides the best communications condition.

22. An antenna diversity communications device according to claim 12, further comprising a unit operable to select one of said at least first and second communications paths with a uniform probability in an initial condition.

23. An antenna diversity communications device according to claim 12, further comprising a unit operable to return said memory unit to the initial condition if no communications are conducted for a prescribed time.

24. An antenna diversity communications device according to claim 12, wherein said signal information is the received intensity of the antenna in the corresponding signal path.

25. An antenna diversity communications device according to claim 12 wherein transmission is carried out using said antenna of the switched communications path.

26. An antenna diversity communications device according to claim 12, including a unit operable to update said signal information concerning said transmission channel of said memory unit using ACK/NAK information in a response to the transmission.

* * * * *

UNITED STATES PATENT AND TRADEMARK OFFICE
CERTIFICATE OF CORRECTION

PATENT NO.        : 7,035,612 B2
APPLICATION NO.   : 10/050678
DATED             : April 25, 2006
INVENTOR(S)       : Michinori Kishimoto et al.

It is certified that error appears in the above-identified patent and that said Letters Patent is hereby corrected as shown below:

In the Specification:

First Page Col. 2 (Attorney, Agent or Firm), Line 1, After "Darby" insert -- P.C. --.

Page 2 Col. 1 (Foreign Patent Documents), Line 4, After "4/1999" insert -- H04B/7/08 --.

Sheet 2 of 10 (Fig. 2) (Y-Axis Heading), Line 1, After "correlation" delete "cofficient" and insert -- coefficient --.

Sheet 3 of 10 (Fig. 3) (Y-Axis Heading), Line 1, After "correlation" delete "cofficient" and insert -- coefficient --.

Sheet 5 of 10 (Fig. 5) (Box besides step12), Line 1, Delete "caluculated" and insert -- calculated --.

Column 3, Line 44, Delete "Vol.," and insert -- Vol. --.

Column 3, Line 45, After "pp" insert -- . --.

Column 3, Line 45, Delete "2000,"" and insert -- 2000, --.

Column 10, Line 63, After "Fig. 4" insert -- , --.

Column 11, Line 53, Delete "instep" and insert -- in step --.

Column 12, Line 65, Delete "received" and insert -- received --.

Column 17, Line 33, Delete "judgement" and insert -- judgment --.

Column 18, Line 23, In Claim 2, after "Claim 1" insert -- , --.

UNITED STATES PATENT AND TRADEMARK OFFICE
CERTIFICATE OF CORRECTION

PATENT NO. : 7,035,612 B2
APPLICATION NO. : 10/050678
DATED : April 25, 2006
INVENTOR(S) : Michinori Kishimoto et al.

It is certified that error appears in the above-identified patent and that said Letters Patent is hereby corrected as shown below:

Column 21, Line 2, In Claim 25, after "Claim 12" insert -- , --.

Signed and Sealed this

Twenty-second Day of August, 2006

JON W. DUDAS
*Director of the United States Patent and Trademark Office*